UNITED STATES PATENT OFFICE.

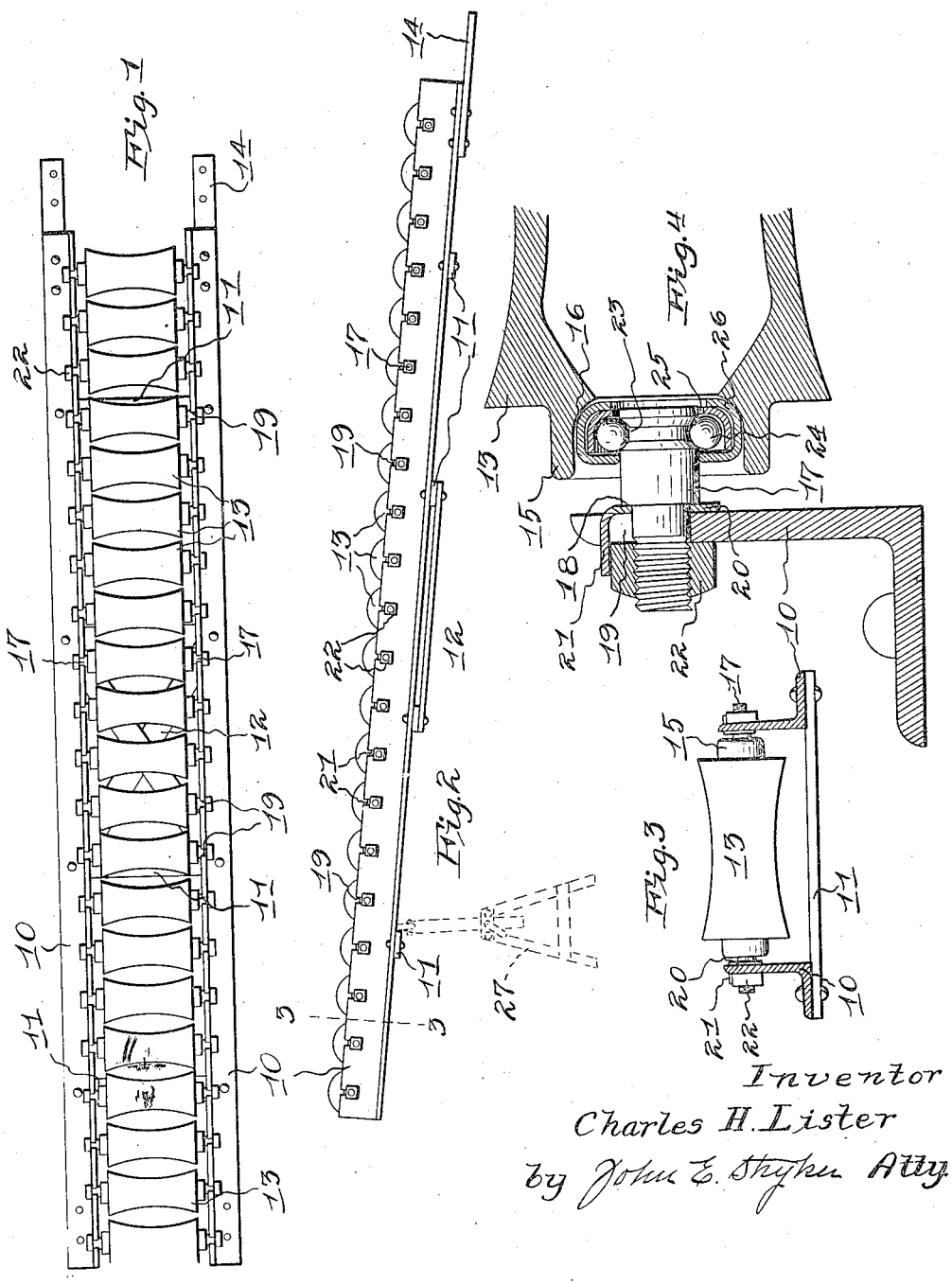

CHARLES HENRY LISTER, OF NORTH ST. PAUL, MINNESOTA.

GRAVITY-CARRIER.

1,348,500.   Specification of Letters Patent.   Patented Aug. 3, 1920.

Application filed May 6, 1918. Serial No. 232,881.

*To all whom it may concern:*

Be it known that I, CHARLES HENRY LISTER, a citizen of the United States, residing at North St. Paul, in the county of Ramsey and State of Minnesota, have invented new and useful Improvements in Gravity-Carriers, of which the following is a specification.

Its object is to provide a light, durable and economical gravity conveyer having concave rollers for transporting articles of merchandise, including pig iron, castings and similar products, from one place to another. A further object is to provide such a device which is readily assembled, and supplied with rollers possessed of economy in manufacture and efficiency in operation. A further object is the provision of strong and simple mounting for the rollers.

In the accompanying drawings, Figure 1 is a top plan of a section of conveyer embodying my invention; Fig. 2 is a side elevation thereof; Fig. 3 is an enlarged transverse cross-section on the line 3—3 of Fig. 2; and Fig. 4 is a detail fragmentary vertical central section through one end of a roller and illustrates the mounting of the rollers.

Referring to the drawings, I have used the reference numeral 10 to designate a pair of parallel angle-irons held in spaced relation by a plurality of cross-bars 11 riveted to the bottom flange of each angle-iron. A further reinforcement against endwise movement of the angle-irons relative to each other is provided by the diagonal cross-bars 12, which are riveted to the angle-irons similarly to the bars 11. Said angle-irons form a frame for the concave rollers 13, and the length of the conveyer may be continued indefinitely by assembling identical sections of angle-irons end to end as by means of fish plates 14.

The rollers 13 are identical and each consists of a hollow metal cylinder having an annularly concave periphery. An integral annular boss 15 is formed upon each end of the cylinder and is coaxial therewith. The socket within said boss 15 is also annular with a symmetrical contraction at its inner end 16 to prevent end play of the roller upon its mounting. Said mounting comprises a stud 17 threaded at its outer end, provided centrally with an annular shoulder 18, and having a channel for the hereinafter-described ball race at its inner end.

Slots 19 to receive the studs are cut in the vertical flanges of the angle-irons 10 at suitable intervals. A lock washer 20 having a radially projecting ear 21 thereon, is placed against said shoulder 18 upon the stud 17 and said stud is inserted in a slot 19 with its threaded outer end projecting through the frame. A nut 22 is turned upon said threaded projecting end of said stud 17 and the lock washer 20 is thereby clamped by the shoulder 18 against the angle-iron with the ear 21 projecting upwardly. Said ear is then bent at right-angles to overlap the nut 22 and lock said nut against turning. The stud 17 is thus rigidly secured to the frame with the inner end thereof, formed with the ball race 23, in position to receive and provide a bearing for a series of balls 24. A pair of annular metal ball retainers 25 and 26 cage the series of balls 24 and are revoluble upon the stud 17. Said ball retainer 26 is crimped to hold the retainer 25 and snugly fits the annular periphery of the socket 15 and abuts against the reduced end 16 of the said socket.

The sections of conveyer may be supported by an adjustable standard 27, or otherwise.

The articles to be conveyed are placed upon the rollers 13, which revolve upon the studs 17, the ball retainers 25 and 26 turning upon the stud simultaneously with the roller. Gravity impels the article from roller to roller and the concavity of the cylinders guides the articles down the center of the conveyer.

Having described my invention, what I claim as new and desire to protect by Letters Patent, is:

1. A mounting for a conveyer roller comprising a support formed with a slot in the upper part thereof, a stud formed with an annular shoulder against the inner side of said support and having a threaded outer end extending through said slot, a nut on said threaded end of said stud, a lock washer adapted to be clenched by the shoulder against the support and formed with an ear extending through the support to engage the nut, and a roller having an end socket revolubly mounted upon said stud.

2. A mounting for a conveyer roller comprising a stud adapted to extend through an aperture in a support, said stud being formed with an annular shoulder projecting inwardly from the support, means for locking the stud in the support, a roller formed with a hollow boss at each end, said boss inclosing a socket symmetrically converging toward its inner extremity, an annular ball race upon the inner end of the stud within said socket, a series of balls in said race, and a pair of annular ball retainers arranged one about the other with the outer retainer formed to fit said socket and rotate therein.

3. In a mounting for a conveyer roller a support, a stud adapted to extend through an aperture in the support, said stud being formed with an annular shoulder inside the support, means for fixing the stud in the support comprising a nut and a lock washer held between the support and shoulder, a roller formed with an axial socket in each end, an annular ball race upon the inner end of the stud within said socket, a series of balls in said race, and a retainer arranged to fit within said socket and rotatable therein.

Whereof, I have hereunto signed my name to this specification.

CHARLES HENRY LISTER.